Patented Dec. 14, 1926.

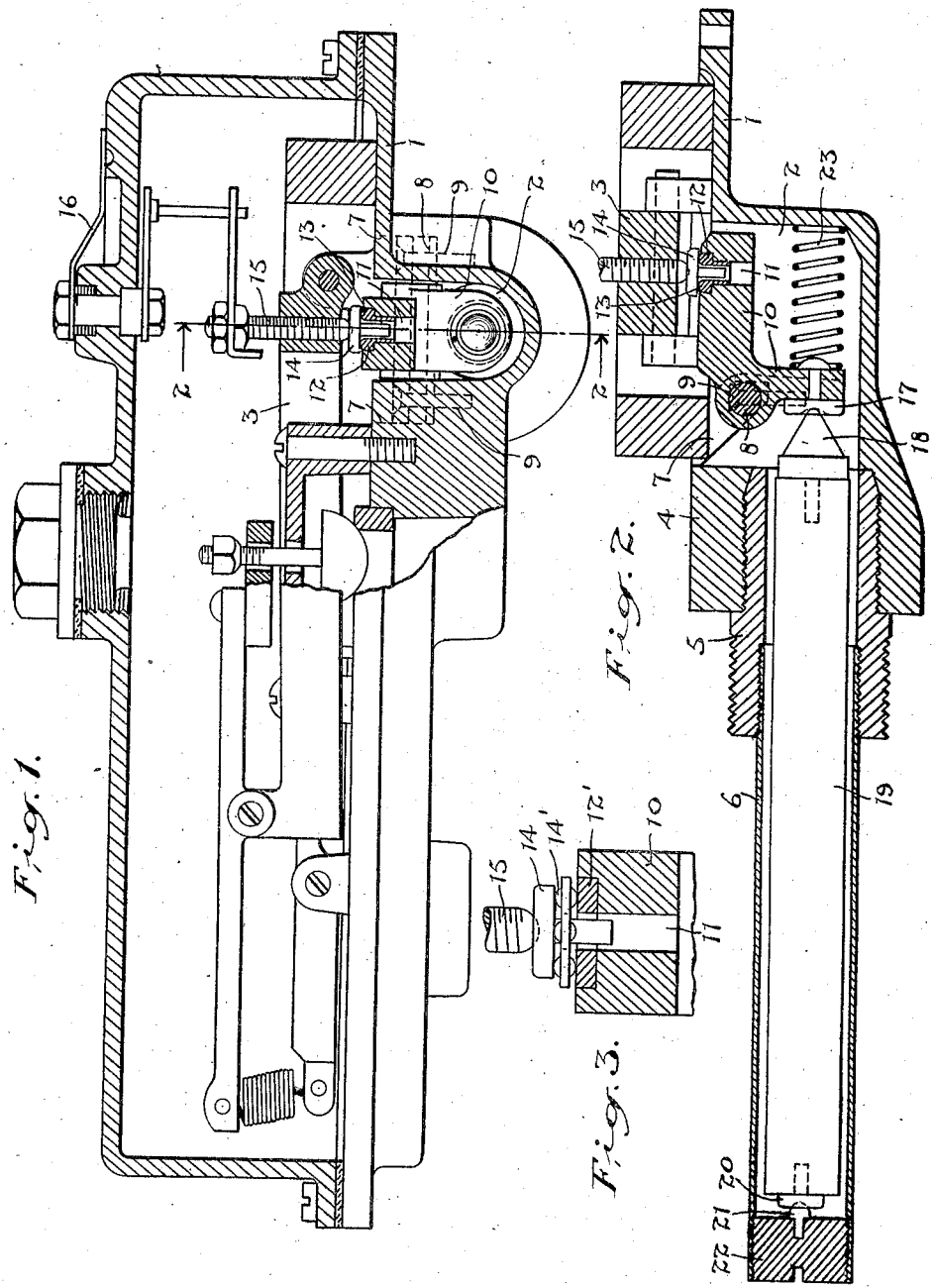

1,610,887

UNITED STATES PATENT OFFICE.

BERNARD RYAN, OF NEW YORK, N. Y.

THERMOSTATIC CONTROLLER FOR GAS WATER HEATERS.

Application filed June 7, 1924. Serial No. 718,519.

The principal objects of the invention are, to render the operation of the controller more dependable by increasing the sensitivity of the operating parts, and to devise a structure which may be used effectively in connection with a horizontally disposed thermostat.

The principal features of the invention consist in the novel construction and arrangement of parts, whereby the carbon rod is suspended between pivotal supports and its movement is transmitted through a bell crank lever having an anti-friction slip bearing contact with the gas control operating levers.

In the drawings, Figure 1 is a part longitudinal section and part elevation of my improved controller.

Figure 2 is a transverse section of the device taken on the line 2—2 of Figure 1.

Figure 3 is an enlarged sectional detail of a modified form of slip bearing.

In the form of thermostatic controller for gas water heaters illustrated in my co-pending application Serial Number 427,257 patented July 1, 1924, No. 1,499,947 the thermostatic copper tube and carbon rod extend downwardly from the bottom of the thermostat casing into a tube or reservoir containing the circulating water and as the expansion and contraction of the copper tube moves the carbon rod and oscillates the main operating lever of the control device upon its pivot, the carbon rod is free to oscillate. If, however, it is desired to arrange the thermostatic rod in a horizontal position, then a special construction of device for transmitting the movement from the thermostatic rod to the control operating levers is required and the free oscillation of the rod cannot be used to function in conjunction with the movement of the main operating lever. Further, as the carbon rod is held in a horizontal position it must be supported free from contact with the copper tube throughout its length, both to ensure sensitivity in operation and safety from breakage.

In the construction herein shown, the casing 1 is formed with a well 2 below the bearing end of the main operating gas control lever 3.

A boss 4 extends outwardly from the side of the casing and in this is secured a brass ferrule 5 and the copper thermostatic tube 6 is secured within said ferrule.

The side walls of the well 2 are formed with recesses 7 having one side sloping and the other side vertical and resting in these wedge-shaped recesses is a pin 8 which is of non-corrosive material such as Monel metal.

The pin is rigidly secured in engagement with the converging walls of the recesses 7 by the screws 9 fastened thereto and threaded in the casing.

Mounted on the pin between the side walls of the well is a bell crank lever 10 having a countersunk hole 11 in its horizontal portion in which is secured a hardened steel bushing 12 having a rounded upper edge 13. Within this bushing is arranged a hardened steel stud 14, the pin of which fits loosely in the bushing and the head of which rests in sliding contact on the rounded upper edge of the bushing so that it will move freely thereon with the least amount of friction and wear.

In place of the bushing 12 it may be found desirable to substitute a ball bearing support for the hardened steel stud 14, the balls 14′ being held in a suitable standard cage and resting upon a hardened steel bushing 12′ presenting a flat face.

The top of the stud is slightly indented to receive the rounded end of the adjusting screw 15 threaded in the main operating lever 3. The function of this adjusting screw is to alter the relation between the thermostat and the operative movement of the opening of the gas valve and it is controlled from outside the casing by the indicating crank member 16.

The lower end of the bell crank lever 10 has secured in it a hardened disc 17 which has a central depression adapted to receive the rounded point of a hardened conical stud 18 which is secured to one end of the carbon rod 19. The other end of the carbon rod has secured therein a hardened steel stud 20 having a cupped end engaging a rounded stud 21 secured in a threaded plug 22 adjustably threaded in the outer end of the copper tube. The carbon rod is thus supported between swivel points and suspended clear of the brass ferrule and copper tube.

A compression spring 23 is arranged between the bell crank lever 10 and the end of the well to hold the bell crank lever in constant but resilient contact with the carbon rod.

It will be seen that as the copper tube expands and contracts the carbon rod will operate upon the bell crank lever and as the points of contact are around the hardened surfaces there will be the minimum of friction in the operative movement of the bell crank and any flexing of the copper tube will have no binding effect. The resilient pressure of the bell crank effected by the compression spring 23 obviates any possibility of fracture of the fragile carbon rod or porcelain in the handling of the thermostat and it automatically compensates for any possible wear of the parts.

A device constructed as described will be extremely sensitive and will remain in effective service indefinitely.

What I claim as my invention is:—

1. In a thermostatic control for gas water heaters, the combination with the main gas control lever operating on a fixed pivot, of a horizontally disposed thermostat, having a suspended rod, a single bell-crank lever mounted on a fixed pivot and pivotally engaging one end of said thermostat rod and slidably engaging said main gas control lever.

2. In a thermostatic control for gas water heaters, the combination with the main gas control lever operating on a fixed pivot, of a horizontally disposed thermostat having a suspended rod, a single bell crank lever pivotally engaging one end of said thermostat rod, and an anti-friction slip bearing mounted on the upper end of said bell-crank lever and operatively engaged by said main gas control lever.

3. In a thermostatic control for gas water heaters, the combination with the gas control levers, of a horizontally disposed thermostat, a bell crank lever engaging one end of said thermostat, and having a hole in the horizontal end, a hardened steel stud having the pin fitting loosely in said hole, an anti-friction bearing engaging the head of said stud, and an adjusting screw arranged in said gas control lever and resting on the head of said stud.

4. In a thermostatic control for gas water heaters, the combination with a horizontally arranged thermostatic tube, of a non-expansible rod arranged within said tube, a pivotal support in the outer end of the tube for one end of said rod, a pivotal support for the other end of said rod, resilient means for flexibly holding the latter support in contact with the rod, a horizontal extension from said pivotal support for the rod, an anti-friction slip bearing on said horizontal member, and means connecting said anti-friction slip bearing with the gas control operating levers.

5. In a thermostatic control for gas water heaters, the combination with a horizontally arranged thermostatic tube having a pivot bearing at its closed outer end, an unexpansible rod having its end engaging said pivot, a bell crank having a pivot bearing engaging and supporting the inner end of said rod, a compression spring holding said bell crank in contact with said rod, an anti-friction slip bearing supported on the horizontal portion of said bell crank and gas control operating levers operatively engaging said slip bearing.

6. In a thermostatic control for gas water heaters, the combination with a horizontally arranged thermostatic tube having a pivot bearing at its closed outer end, an unexpansible rod having a hardened cup bearing engaging said pivot, a hardened conical stud secured to the opposite end of said rod, a bell crank lever mounted on a fixed pivot and having a cupped bearing engaging said conical stud, resilient means for holding said bell crank in contact with said stud to support said rod, and gas control levers operatively engaging the bell crank lever.

BERNARD RYAN.